(No Model.)
J. ROBERTSON.
GAS REGULATOR.
No. 330,263. Patented Nov. 10, 1885.
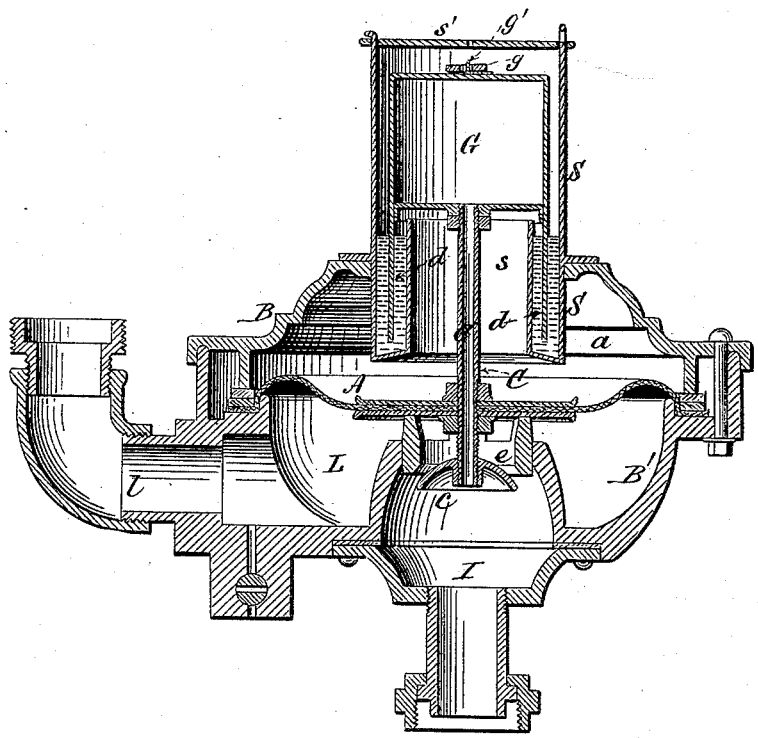
Witnesses:
John I. Bate,
Wm Gardner
Inventor.
James Robertson
By his Attorney,
Geo. W. Miatt

UNITED STATES PATENT OFFICE.

JAMES ROBERTSON, OF BROOKLYN, NEW YORK.

GAS-REGULATOR.

SPECIFICATION forming part of Letters Patent No. 330,263, dated November 10, 1885.

Application filed March 16, 1885. Serial No. 159,134. (No model.)

*To all whom it may concern:*

Be it known that I, JAMES ROBERTSON, a citizen of the United States, residing in the city of Brooklyn, county of Kings, and State of New York, have invented certain new and useful Improvements in Gas-Regulators, of which the following is a specification.

My invention relates to that class of apparatus which is intended to automatically equalize the flow of the gas consumed, notwithstanding variations in pressure occurring in the "main" or supply pipe, and irrespective of the number of burners in use.

It relates more particularly to the regulators of the above class, in which the degree of pressure exerted by the gas upon a flexible diaphragm is utilized to determine the position of the inlet or regulator valve relatively to its seat, and thus to graduate the area of such opening according to the pressure desired for the number of lights in use.

For various reasons, in devices heretofore known and used as automatic gas-regulators, the desired results have been but imperfectly attained, if at all. For instance, in the diaphragm gas-regulators, as well as those in which an inverted cup is employed in lieu of a diaphragm, the gas acts only upon the diaphragm or cup at a low pressure after its passage through the regulator valve, and the entire downward pressure of the diaphragm or cup, valve, &c., has to be sustained thereby, so that any sudden increase in the amount of gas consumed, or of the pressure in the main, or any jarring or undue vibration imparted to the regulator from any cause, will create an excessive degree of disturbance and fluctuation before an equilibrium is again attained. In other words, the regulator-valve is not sustained or balanced with sufficient steadiness, and no adequate provision is made for neutralizing the inertia of the operative parts of the device.

The main object of my invention is to overcome these difficulties and at the same time render the apparatus more delicate, sensitive, and prompt in its action; and the essential feature of my invention consists in utilizing the full or high pressure of the gas at a point above the regulator-valve, in such manner as to sustain and balance it and its diaphragm. By this means I am enabled to practically suspend the operative parts, so that their weight might be entirely counteracted, if desired, and it is therefore obvious that the downward pressure which they may be caused to exert can be regulated with the greatest delicacy. The importance of this method of floating or suspending the regulator-valve and diaphragm will be obvious when it is considered that the low-pressure surface is thus practically relieved from any interference due to fluctuations in the main or high pressure gas, since any increase or diminution in such pressure will instantly increase or diminish the lifting capacity of the high-pressure chamber above, and thereby cause the area of the regulating-valve to conform thereto, without sensibly affecting the low-pressure gas beyond. The regulation thus effected is much more rapid and certain than when accomplished by the low-pressure gas in the old way, while the full pressure of the gas-main is utilized to sustain the parts in position against undue vibration or jar from external causes, as I have demonstrated by actual experience.

I am aware that the main or high pressure gas has heretofore been admitted through a hollow valve-stem to a point above the valve, where it was designed to have it act upon the upper side of a diaphragm secured to such valve-stem for the purpose of pressing the latter downward and opening the valve; but such an arrangement is diametrically opposite to my invention in construction and principle of operation.

My invention is applicable to a variety of forms of gas-regulators; but for the purpose of illustration I have shown it in the accompanying drawings as practically embodied and combined with the form of diaphragm gas-regulator shown and described in Letters Patent No. 274,733, of March 27, 1883, in which an inverted cup attached to the valve-stem and resting in a liquid-seal is connected with the space above the diaphragm in such manner as to isolate the air contained in such space from contact with the atmosphere while permitting it to conform to the movement of the diaphragm.

The drawing represents a central vertical section of a regulator.

In general construction the apparatus is substantially the same as that shown and described in the patent above referred to, the flexible diaphragm A being clamped between the upper and lower sections of the case B B', and having secured to its center the valve-stem C, which latter is provided upon the under side with the regulator-valve $c$, and upon the upper side with the inverted cup $d$.

The valve-seat $e$ is interposed between the inlet I, which is connected with the main or supply pipe in the ordinary manner, and the low-pressure gas-chamber L, underneath the diaphragm, which chamber is in turn connected by a suitable outlet, $l$, with the pipes to the burners.

The lower portion of the inverted cup $d$, attached to the upper portion of the valve-stem C, rests in the liquid contained within the sealing-chamber S, which is formed with a comparatively wide central passage, $s$, connecting the air-space $a$ above the diaphragm with the interior of the inverted cup $d$. Suitable packings interposed between the upper and lower sections, B B', of the case render the chamber $a$ air-tight. Thus far the construction of the parts is old, excepting that the valve-stem C is hollow, consisting of a tube of suitable length, formed with exterior male screw-threads for engaging the female screw-threads in the valve-nuts, &c. This hollow valve-stem C, open at both extremities, affords the most appropriate and direct means of communication between the under side of the regulator-valve $c$ and my auxiliary high-pressure gas-chamber or buoy, G, which is attached to the upper extremity of the valve-stem. This auxiliary gas-chamber is preferably, though not necessarily, made in the form of an inclosed and sealed chamber, as shown, the essential feature of construction which I claim as original with myself being the formation of a gas-chamber or bearing-surface above and attached to the regulator-valve and diaphragm below, and communicating directly with the inlet or high-pressure chamber of the apparatus. For instance, the auxiliary chamber G might consist of an inverted cup, like $d$ in the drawing, upon the under side of which the high-pressure gas might be made to impinge with a similar result; but such construction, though operative, would be objectionable, for the reason that the liquid-seal would deteriorate in time by contact with the gas.

An independent means of communication between the auxiliary gas-chamber G and the inlet or high-pressure chamber I may be used, if preferred, and the valve-stem made solid, as heretofore, provided the permanent attachment of the said buoy or auxiliary chamber is maintained with the regulator-valve and diaphragm. The area or bearing-surface of the auxiliary gas-chamber G should be proportioned and arranged with relation to the area and weight of the regulator-valve and diaphragm, so that the latter in use may exert only the average required downward pressure, and any alterations that may be required can be readily effected by adding or removing small weights $g$, preferably upon or from the top of the said buoy G. In the drawing the float G is shown as provided with a small spur or projection, $g'$, which answers the double purpose of centralizing any weights which may be placed thereon, and of affording a means of screwing or unscrewing the chamber G upon or from the upper end of the valve-stem, when necessary, without disturbing the other parts of the apparatus.

The cover $s'$ to the seal-chamber S, which is attached in any desired way, may be perforated, if necessary, to permit of the free passage of air to compensate for the movements of the buoy G; but ordinarily where a simple loose connection is used, like that shown in the drawing, this will not be necessary.

To illustrate the operation of my improvement, supposing the average pressure in the main or inlet I to be, say, about $\frac{15}{10}$ hydraulic scale, the downward pressure of the diaphragm, &c., is regulated as before indicated, so as to impart a pressure of, say, $\frac{5}{10}$ to the gas in the low-pressure chamber L. Any increase in the quantity of gas consumed will now allow the diaphragm to lower the regulator-valve in the usual way, except that the buoyance of the high-pressure chamber G above will prevent a too sudden descent or jar. If, on the other hand, there is an increase in the pressure in the main, the buoyant power of the auxiliary chamber G will be instantly increased in proportion, and the regulator-valve $c$ be thereby closed more or less without affecting the gas in the low-pressure chamber L.

In case of jar or vibration from extraneous causes, the auxiliary chamber G, by buoying and supporting the regulator-valve and diaphragm from above and independent of the case of the apparatus, tends greatly to neutralize the effects of such disturbance. In fact, under all circumstances my improvement insures a more steady and uniform flame than has heretofore been attainable.

Having thus shown and described my invention as practically applied to a diaphragm gas-regulator of a given form, it is to be understood that I do not limit myself to any particular construction of apparatus as a whole.

I do not claim, broadly, the use of the main or high pressure above the valve for the purpose of affecting the action of the latter; but

What I claim, and desire to secure by Letters Patent, is—

1. In an automatic gas-regulator, the combination, with a regulator-valve and a low-pressure diaphragm, of an auxiliary gas-chamber or float communicating with the inlet or high-pressure chamber below the regulator-valve, attached to the said parts and arranged so as to exert an upward pressure which tends to close the regulator-valve, substantially in the manner and for the purpose described.

2. In an automatic gas-regulator, substantially such as designated, the combination and arrangement, with the regulator-valve and low-pressure diaphragm, of the common hollow stem formed with an enlarged gas-chamber or float at its upper end and connecting such inclosed gas-chamber or float with the inlet or high pressure-chamber below the regulator-valve, for the purpose and substantially in the manner described.

JAMES ROBERTSON.

Witnesses:
WM. GARDNER,
GEO. W. MIATT.